(12) United States Patent
Wang et al.

(10) Patent No.: US 10,165,836 B2
(45) Date of Patent: Jan. 1, 2019

(54) METHOD OF FORMING A MARKING ON AN ARTICLE, AND AN ARTICLE HAVING A MARK THEREON

(71) Applicant: Master Dynamic Limited, Shatin, New Territories (HK)

(72) Inventors: Yingnan Wang, Shatin (HK); Ching Tom Kong, Pat Heung (HK); Zhuonan Miao, Shatin (HK)

(73) Assignee: Master Dynamic Limited, Shatin (HK)

( * ) Notice: Subject to any disclaimer, the term of this patent is extended or adjusted under 35 U.S.C. 154(b) by 0 days.

(21) Appl. No.: 15/387,518

(22) Filed: Dec. 21, 2016

(65) Prior Publication Data
US 2017/0188671 A1    Jul. 6, 2017

(30) Foreign Application Priority Data
Dec. 31, 2015 (HK) .................................. 15112908

(51) Int. Cl.
*B32B 3/00* (2006.01)
*A44C 27/00* (2006.01)
(Continued)

(52) U.S. Cl.
CPC .......... *A44C 27/00* (2013.01); *B21C 51/005* (2013.01); *B22C 9/22* (2013.01); *B22D 19/00* (2013.01);
(Continued)

(58) Field of Classification Search
CPC ......... A44C 27/00; B21C 51/005; B22C 9/22; B22D 19/00; B22D 23/00; G02B 5/1852; G02B 5/1861
See application file for complete search history.

(56) References Cited

U.S. PATENT DOCUMENTS

| 6,533,181 B1 | 3/2003 | Roxby et al. |
| 2005/0211114 A1 | 9/2005 | Fahrenbach et al. |
(Continued)

FOREIGN PATENT DOCUMENTS

| CN | 1819904 A | 8/2006 |
| CN | 104181801 A | 12/2014 |
(Continued)

OTHER PUBLICATIONS

He, Yandong, Authorized Officer, State Intellectual Property Office of the P.R. China, "International Search Report" in connection with related International Application No. PCT/CN2016/113441, dated Apr. 1, 2017, 8 pages.
(Continued)

*Primary Examiner* — Elizabeth E Mulvaney
(74) *Attorney, Agent, or Firm* — Kolisch Hartwell, P.C.

(57) ABSTRACT

A mold for imparting a marking including a requisite optical element has two and a half dimensions (2.5D) to the outer surface of an article formed from a ductile material. The mold includes a marking surface for imparting the mark to an outer surface of the article. That imparting is done by localized plastic deformation of the material from which the article is formed upon the mold and the article being urged against each other. The marking surface includes a microstructure formed by an arrangement plural micro meter sized recessed or protruded entities. The entities are arranged in a predetermined arrangement in relation to each other, and the entities are arranged as a micro-structure having two and a half dimensions (2.5D). The entities are arranged in an inverse arrangement compared to the optical element, and to provide the recesses extending from the marking surface into the mold.

23 Claims, 10 Drawing Sheets

(51) Int. Cl.
*B21C 51/00* (2006.01)
*B22C 9/22* (2006.01)
*B22D 19/00* (2006.01)
*B22D 23/00* (2006.01)
*B44B 5/02* (2006.01)
*G02B 5/18* (2006.01)

(52) U.S. Cl.
CPC .............. *B22D 23/00* (2013.01); *B44B 5/026* (2013.01); *G02B 5/1852* (2013.01); *G02B 5/1861* (2013.01)

(56) References Cited

U.S. PATENT DOCUMENTS

| | | |
|---|---|---|
| 2009/0308530 A1 | 12/2009 | Massicot et al. |
| 2010/0294015 A1 | 11/2010 | Fahrenbach |
| 2010/0294146 A1 | 11/2010 | Fragala et al. |

FOREIGN PATENT DOCUMENTS

| | | |
|---|---|---|
| CN | 104210304 A | 12/2014 |
| HK | 1213429 A2 | 6/2016 |
| WO | 2010111798 A1 | 10/2010 |
| WO | 2015158290 A1 | 10/2015 |

OTHER PUBLICATIONS

He, Yandong, Authorized Officer, State Intellectual Property Office of the P.R. China, "Written Opinion of the International Searching Authority", in connection with related International Application No. PCT/CN2016/113441, dated Apr. 1, 2017, 6 pages.

U.K. Intellectual Property Office, "Search Report Under Section 72 of the Hong Kong Patents (General) Rules" in connection with related Hong Kong Application No. 15112908.9, dated Mar. 3, 2016, 5 pages.

Callan, Feargel, Examiner, European Patent Office, "European Search Report" in connection with related European Patent Application No. 16207371, dated May 12, 2017, 3 pages.

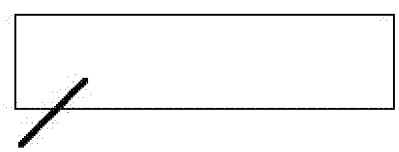
500   Figure 5(a)
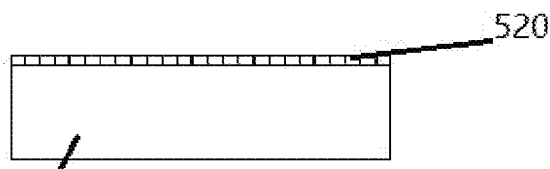
Figure 5(b)
Figure 5(c)
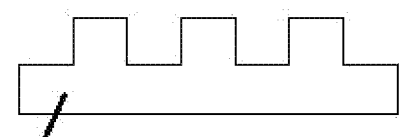
500   Figure 5(d)
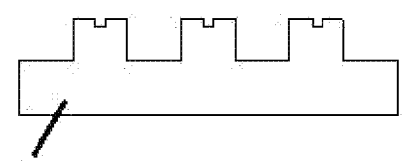
500   Figure 5(e)

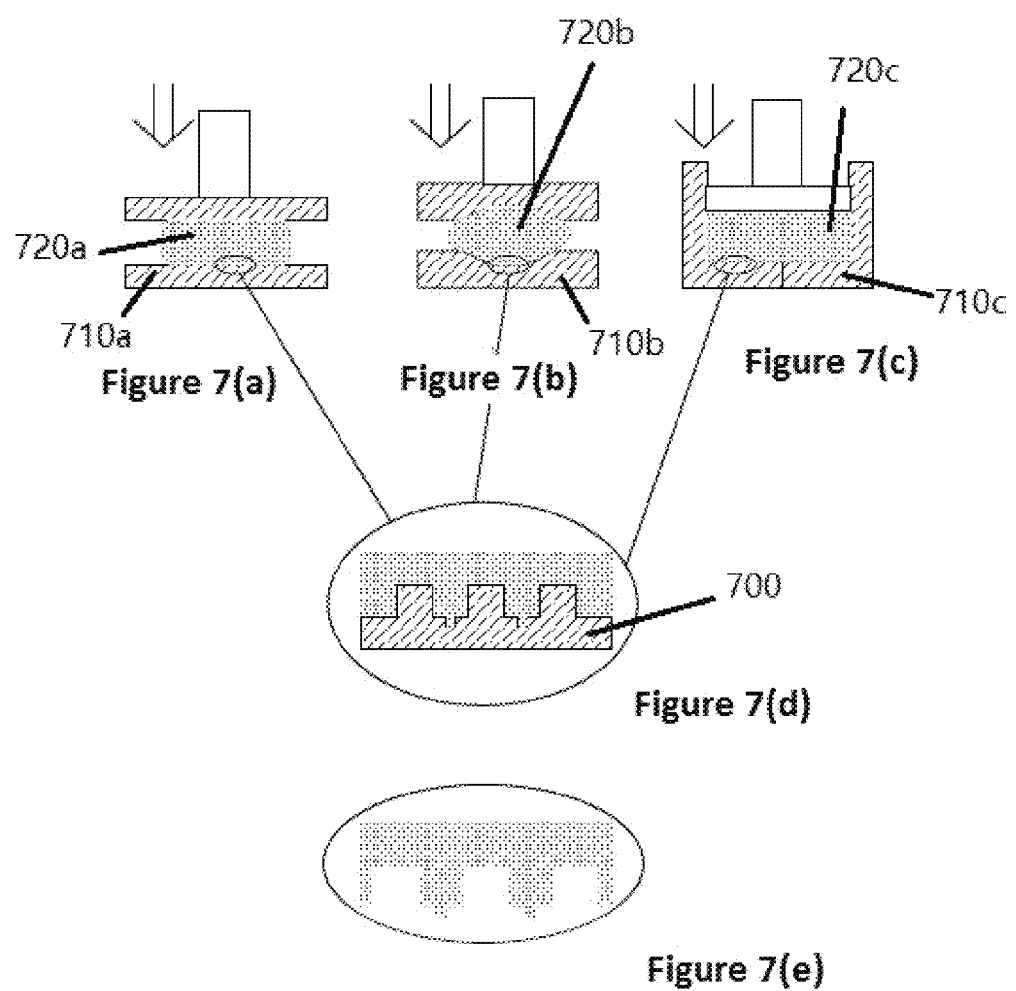

METHOD OF FORMING A MARKING ON AN ARTICLE, AND AN ARTICLE HAVING A MARK THEREON

TECHNICAL FIELD

The present invention relates to a method of applying a marking to an article and an article having a mark applied thereon, in particular a method for applying a mark to an article and an article formed of a ductile material having the mark thereon.

BACKGROUND OF THE INVENTION

Marking of articles is very important for security, anti-theft and anti-counterfeiting purposes. Particularly in reference jewellery articles, marking is paramount in this regard.

However, as articles of jewellery are typically articles of adornment, such jewellery articles should have markings which are relatively discrete and do not interfere with the aesthetic qualities and properties of a jewellery article and as such, the marking should be quite small and non-obtrusive.

Often, an article of jewellery formed from metallic materials such as gold, gold based alloys, precious metals and the like, marks for identification purposes, security purposes and anti-theft, anti-counterfeiting purposes and the like, are applied to the metallic body of the article of jewellery.

For integrity purposes, a marking must not be readily reproducible or readily removable, and must be configured so that when such a mark is read there is high confidence that it is indeed the original mark and hence identifies the correct article of jewellery.

Whilst serial numbers and unique designs/logos have been used over the years for identification purposes, and have been applied by various means such as engraving, etching or punching, these can often be readily replicated, these do not necessarily afford the level of security as required.

Furthermore, the application of such marks to jewellery articles can be time consuming and inconsistent, thus reducing confidence as to whether an article carrying such a mark is indeed the original article or if the mark is indeed original.

OBJECT OF THE INVENTION

It is an object of the present invention to provide a method of marking articles and articles having a marked applied thereto by such a method, which substantially overcome or ameliorate at least some of the deficiencies as associated with the prior art.

SUMMARY OF THE INVENTION

In a first aspect, the present invention provides a mold for imparting a marking including a requisite optical element having two and a half dimensions (2.5D) to the outer surface of an article formed from a ductile material, said mold comprising:

a marking surface for imparting the mark to an outer surface of the article by way of localized plastic deformation of the material from which the article is formed upon the mold and the article being urged against each other, said marking surface including a micro-structure formed by an arrangement of a plurality of micro meter sized recessed or protruded entities;

said entities being arranged in a predetermined arrangement in relation to each other and said entities being arranged as a micro-structure having two and a half dimensions (2.5D), wherein said entities are arranged in an inverse arrangement in respect of the requisite optical element to be formed on the surface of an article, and said entities are arranged so as to provide one or more recesses extending in a direction of from said marking surface into the mold;

wherein said one more recesses are sized and shaped such that upon the mold being urged against the article, the optical element is imparted to the article upon deformation of the ductile material so as to conform with the surfaces of the plurality of micro meter sized recessed or protruded entities; and wherein ductile material is plastically deformed and urged into said one or more recesses and conforms with the recesses, wherein deformation and flow of the ductile material into the recesses reduces lateral stresses imparted to the mold adjacent the recesses, and ductile urged into the recesses forms a portion of the material from deformation of the ductile material being imparted to the entities optical element having two and a half dimensions (2.5D).

In an embodiment, wherein the entities are arranged in a periodic arrangement at a predetermined period such that when the optical element is imparted to the article, upon exposure of light to optical element, light of a predetermined wavelength is reflected by the optical element such that the optical element is viewable having an enhanced colour effect of said wavelength.

The entities may be arranged in a predetermined geometric relationship such that the optical element imparted to the article includes an indicia therein.

In another embodiment, the entitles may be arranged in a predetermined arrangement, such that light of a predetermined wavelength and angle of incidence is reflected from an optical element imparted to the article a manner so as to provide a projected holographic representation. The entities include entities that may be arranged in a random and irregular distribution.

In a second aspect, the present invention provides an article formed from a ductile material having a marking including a requisite optical element having two and a half dimensions (2.5D) formed on the outer surface of the article, said marling including:

a micro-structure formed by an arrangement of a plurality of micro meter sized recessed or protruded entities, said entities being arranged in a predetermined arrangement in relation to each other and said entities being arranged as a micro-structure having two and a half dimensions (2.5D), wherein the arrangement of the plurality of micro meter sized recessed or protruded entities provides a marking including an optical element.

The entities may be arranged in a periodic arrangement in at least one direction, and the entities may be arranged in a periodic arrangement at a predetermined period such that upon exposure of light to optical element, light of a predetermined wavelength is reflected by the optical element such that the optical element is viewable having an enhanced colour effect of said wavelength.

The entities may be arranged in a predetermined geometric relationship such that the optical element article includes an indicia therein.

The entitles may be arranged in a predetermined arrangement, such that light of a predetermined wavelength and angle of incidence is imparted to the article in a manner so as to provide a projected holographic representation.

The entities may be arranged in a random and irregular distribution.

The article is preferably formed from a metal or a metal alloy, preferably a gold or a gold based metal.

Preferably, the article is an article of jewellery, and the optical element preferably provides an identification mark to the article.

In a third aspect, the present invention provides a method of applying a marking including an optical element to an article formed from a ductile material, wherein a mold according to the first aspect is urged against an outer surface of the article, such that the optical element is formed from an inverse of the arrangement of the entities of the mold.

In a fourth aspect, the present invention provides an article having a marking including an optical element thereon, wherein the optical element has been imparted to the article by way of the method according to the third aspect.

Preferably the article is formed from a metal or a metal alloy, and more preferably the article is formed form gold or a gold based metal. The article is preferably an article of jewellery.

Preferably, the optical element imparted to the article provides an identification mark to the article.

In a fifth aspect, the present invention provides a process for forming mold for imparting a requisite optical element to the surface of an article, said mold having a marking surface including a micro-structure formed by a lattice of a plurality of discrete micro meter sized recessed or protruded entities, said entities are arranged in a predetermined arrangement in relation to each other and said entities are arranged as a microstructure having at least 2 dimensions, and said entities are arranged in an inverse arrangement in respect of a requisite optical element to be formed on the surface of an article, wherein said mold is formed from a micro fabrication techniques, preferably including photolithography and ion beam micro fabrication techniques.

In an embodiment, the entities may be provided in a periodic arrangement.

The entities may be formed as a 2.5D structure.

In a sixth aspect, the present invention provides a mold when formed according to the process of the fifth aspect.

In a seventh aspect, the present invention provides a method of providing an optical element to an article, said method including the steps of:
 (i) providing a mold of the first aspect, and
 (ii) applying a molten material to the mold by way of a casting process.

In an eighth aspect, the present invention provides a method of providing an optical element to an article, said method including the steps of:
 (i) providing a mold of the first aspect, and
 (ii) urging an article to which the optical element is to be applied against the mold by way of a forging process.

In a ninth aspect, the present invention provides a method of providing an optical element to an article, said method including the steps of:
 (i) providing a mold of the first aspect, and
 (ii) urging an article to which the optical element is to be applied against the mold by way of a stamping process.

In a tenth aspect, the present invention provides an article carrying thereon an optical element, wherein the optical element has been applied to the article by the method of any one of the, seventh, eighth of ninth aspects.

BRIEF DESCRIPTION OF THE DRAWINGS

In order that a more precise understanding of the above-recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description is specific to the embodiments disclosed.

FIGS. 5(a) to 5(e) depict a schematic representation of a process to produce an example of a 2.5D micro structure mold by way of a micro fabrication technique;

FIGS. 7(a) to 7(e) depict a schematic representation of a forging process for imparting a 2.5D optical element to the surface of an article;

DETAILED DESCRIPTION OF THE DRAWINGS

Figure 1:
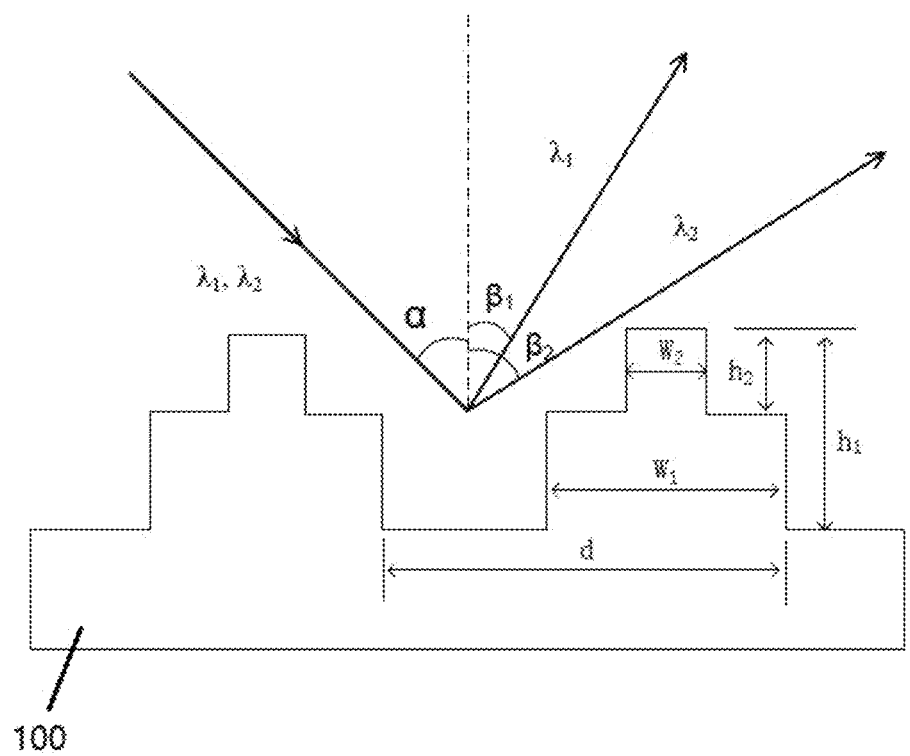
FIG. 1 depicts a schematic illustration of the effect of the 2.5D micro structure as utilised in embodiments of the present invention.

Embodiments of the present invention provide for the marking of jewellery articles with an optical element which may utilizes a mold, stamp, die, punch or the like, in which a pattern or indicia is formed for imparting a marking to an article, for example a jewellery article formed from gold, gold based alloys, precious metals or the like.

In particular, embodiments of present invention provide for a marking within a ductile material from which an article is formed so that a marking is formed on the surface of the article, by providing an arrangement of a micro structure in a mold for the marking of the article, whereby the arrangement of the microstructure allows for a stamping or punch process such that the inverse of arrangement of the micro structure arrangement.

In other embodiments, the present invention provides for providing an optical element to a material of an article by way of a casting process or a forging process.

In the present invention, the micro structure is formed from a lattice entities which are sized and arranged in a predetermined manner, which may be regular or irregular, such that the mark formed on the surface of the article of jewellery is an optical element.

The optical element is configured such that upon applicable and predetermined lighting conditions, a predetermined optical effect is generated. This optical effect provides an identification effect, such that the article of jewellery may be identified as being the article which it is represented as being.

Accordingly, the present invention provides for application of an optical element for the marking of jewellery or ornaments formed from gold or gold based materials, for:—
  Assessing authenticity of an article of jewellery or an ornament,
  Identification of an article of jewellery or an ornament,
  Demonstrating origin of an article of jewellery or an ornament,
  Security identification of an article of jewellery or an ornament, and
  Anti-counterfeiting and anti-theft protection of an article jewellery or an ornament.

The use of the present invention for forming optical elements on the surface of jewellery articles or ornaments formed from ductile materials, affords advantages over existing marking techniques for the marking of such articles.

In particular, the present invention provides for the marking of ductile materials with optical elements which have a two and a half dimensional (2.5D) micro structure, and a process for manufacture of a mold having such a micro structure.

Two and a Half (2.5D) Arrangement of Present Invention

As provided by the present invention, a marking formed from micro entities on an article from a mold or stamp is provided by way of a stamping process. The material from which the article is formed is a ductile material, such as a metal allow such as gold or gold allow.

The mold or stamp is formed having a marking surface having a surface area for imparting a mark to an outer surface of the article by way of localized plastic deformation of the material from which the article is formed.

The marking surface includes a micro-structure formed by a lattice of a plurality of discrete micro meter sized recessed or protruded micro entities.

The entities are arranged in a predetermined arrangement in relation to each other and the micro entities are arranged as a micro structure having two and a half dimensions (2.5D), and the entities are arranged in an inverse arrangement in respect of a requisite optical element to be formed on the surface of an article.

Within the predetermined arrangement of micro entities of the mold, there are provided recesses or rebates, which may also considered as concave portions, defined by adjacent material from which the mold or stamp is formed.

The recesses or rebates extend into the mold or stamp in a direction opposite to which the mold or stamp is urged when applying a mark to the ductile material, such that when the mold or stamp is urged against the ductile material so as to form the marking, ductile material flows into the recesses or rebates.

The recesses or rebates do not have any laterally extending "undercuts", such that the material which is urged into the recesses or rebates and which forms a shape defined by the geometry of the recesses or rebates, is not damaged when the mold or stamp is removed from the article following formation of the marking.

The marking formed in the ductile material is thus a 2.5D micro structure, and the ductile material urged into the recesses or rebates forms part of the marking which is comprised essentially of a 2.5D arrangement of micro entities, which may be considered an inverse of the arrangement of micro entities of the mold or stamp.

Within the prior art, stamps used to mark ductile materials such as gold, have a very low longevity, and typically have a usable life of less than 100 cycles. Such molds deteriorate or fracture due to stresses in the mold from the stamping process, which can cause inconsistent marking as well as a cost to replace the mold, potential complications in forming a mold exactly the same, delay in production, and increased uncertainty of originality when assessing a marked article with a master copy of the mark, for example.

It will be understood by those skilled in the art, when fine detail is required for the formation of complex geometries, portions of the mold which impart a pattern to article which are micro entities, are exposed to high loads due to the load required to plastically deform a ductile material such as gold or gold based materials. Accordingly, localized stresses applied to micro entities of the mold cause failure of the mold.

In particular, at portions of a mold which are smaller than other portions of the mold, excessive stresses applied to such small portions can cause failure of the mold.

Accordingly, by providing stress relief features for a marking as provided by the present invention, the present inventors have been able to provide a mold repeatedly impart a marking including an optical element to the surface to articles formed from materials such as gold or gold based materials, which:
  (i) provides a 2.5D marking including an optical element suitable for security purposes and the advantages associated therewith as discussed further below, and
  (ii) provides a mold which can withstand localized stresses during marking the article and the advantages associated therewith as discussed further below, The present inventors have, by incorporating recesses or rebates in as mold or stamp in accordance with the present invention, have been able to obviate the shortcomings and deficiencies of the prior art, by provision of the recesses or rebates, which allow material to flow in a controlled manner in a requisite direction, which relieves stresses during the stamping process, and reduces stresses applied laterally to the mold with respect to the direction of motion when the mold and article are urged towards each other.

Furthermore, as will be described further below, a marking or micro entities having a 2.5D structure also provide enhanced optical effects of a marking, which may use utilized in an identification procedure.

Still further, the present invention allows for more complex markings to be applied to an article, providing enhanced anti-counterfeiting attributes.

Accordingly, the present invention provides advantages over the prior art from both manufacturing and end product standpoints.

The present invention is particularly useful for the marking of gold or gold based articles, such as jewellery or ornaments, whereby consistency of marking and difficulty to emulate, as well as able to be small enough to be hidden and not detract from the overall optical attributes of the article is important.

A 2.5D arrangement may be utilized in accordance with the present invention, for either an irregular or a regular arrangement of micro entities. As such, the present invention includes the following two implementations of optical elements as imparted to a ductile material by way of a 2.5D mold (i) holographic effect—in such an embodiment, a predetermined arrangement of micro entities is formed in the mold, such that when the arrangement is imparted to an article and the arrangement is illuminated with a light source of a predetermined wavelength, light is reflected from the article such that a holographic effect is projected on an adjacent viewing panel, (ii) periodic or quasi-periodic arrangement whereby an optical element may be applied to the surface of an article having a periodic arrangement extending in at least one direction. Such an element may be viewed with or without the aid of microscopy under white light or a particular predetermined lighting condition as discussed below, and (iii) non-periodic arrangement whereby an optical element may be applied to the surface of an article having a non-periodic arrangement, and such an element may be viewed with or without the aid of microscopy and assisted using particular lighting conditions.

The above three embodiments of utilisation of a 2.5D mold in accordance with the present invention are discussed in detail below, as well as the advantages as provided by a 2.5D mold of the present invention.

GENERAL BACKGROUND DESCRIPTION TO SOME EMBODIMENTS OF INVENTION

By way of background and referring to FIG. 1, there is shown a schematic illustration of the manner in which a 2.5D micro structure as utilized in accordance with some embodiments of the present invention is implemented and functions, when a pattern or a mark is imparted to an article 100.

When a plane wave of wavelength $\lambda$ with normal incidence, which is perpendicular to in the present example having a regular periodic arrangement having a grating, each 2.5D micro structure acts as a quasi point-source from which reflected light propagates in all directions.

After light interacts with the grating, the diffracted light is composed of the sum of interfering wave components emanating from each slit in the grating. Due to the phase variation at different points resulted from the path length difference to each slot in the grating, the light intensity will add or subtract from one another to create peaks and valleys.

When the path difference between the light from adjacent slits is equal to half the wavelength, $\lambda/2$, the waves will cancel each other to create points of minimum intensity. Similarly, when the path difference is $\lambda$, or an integral multiply of $\lambda$, the phases will add together and maxima will occur.

For a given incident angle of $\alpha$, the maxima occurs when the relationship named as ideal grating equation, $m\lambda = d(\sin \alpha \pm \sin \beta)$ is satisfied, where m is the diffraction order and d is the grating period.

As shown in FIG. 1 whereby a 2.5D microstructure is schematically represented, when the incident light comprises two monochromatic light beams with wavelengths $\lambda 1$ and $\lambda 2$, the resulted diffraction angles $\beta 1$ and $\beta 2$ are different and the wavelength dependent dispersion of light appears.

The efficiency of the grating is related to the period d, width w1, w2 and height h1, h2. By varying these parameters, the grating efficiency can be adjusted.

A mold formed according to the present invention has a micro structure that may be formed by a lattice comprising a plurality of micro sized entities, which may be protrusions or recesses or a combination thereof. The micro entities may be arranged in a regular arrangement or an irregular arrangement so as to form an optical element for the embodiments as mentioned above.

Example of Holographic Optical Element—Irregular Arrangement

Referring to FIGS. 2(a) to 2(d), the present invention may be utilized in order to form a mold of a 2.5D microstructure to impart an optical element to an article such as a jewellery article formed from a gold or gold based material, whereby the optical element is capable of reflecting light such that a holographic image is viewable, which may be utilized as an anti-counterfeiting mark. In other embodiments, a 2D structure may be used or portions thereof, depending upon the holograph requirements. However incorporation of 2.5D aspects of the invention as discussed in further detail below, provides advantages to the use of such a mold. Such 2.5D features incorporated within a mold provide stress relief and flow of ductile material from which article is formed during a stamping or marking process.

Figure 2A:
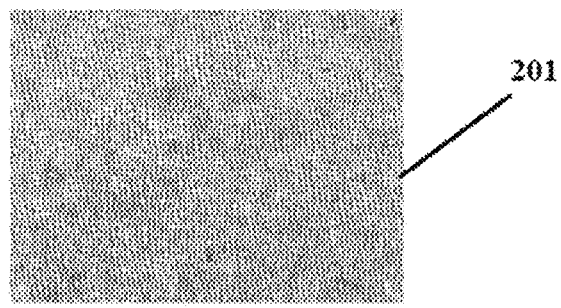
FIG. 2(a) depicts a microscopic photographic representation of a mold as utilized in an embodiment of the present invention at a magnification of 20×.
Figure 2B:
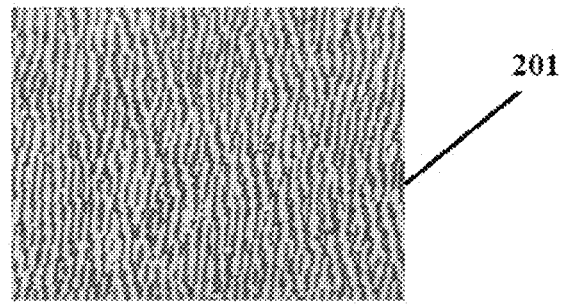
FIG. 2(b) depicts a microscopic photographic representation of a mold as utilized in the embodiment of FIG. 2(a) at a magnification of 50×.

A pattern may be formed in a hard material as a mold 201, such as nickel of nickel alloy, by way of an appropriate MEMS fabrication technique, as shown in FIG. 2(a) at a magnification of 20× and as shown in FIG. 2(b) at a magnification of 50×.

When forming the mold 201, in order to obtain a clear and non-distorted projected holographic image of the mark as discussed below, the pixel size utilized in forming the 201 mold should be as small as possible, and a size of less than 1 micron is preferred. In addition to pixel size, a greater pixel density is preferable.

When designing the layout of pixels which are indicative of micro entities formed in the 201 mold, a holograph pattern is generated through complicated optical theoretical calculation.

Referring to FIG. 2(a) and FIG. 2(b) as will be noted, there are only numerous dots having an irregular distribution forming a finger print-like pattern. Such a pattern is extremely difficult to replicate, giving rise to increased security aspects of the invention due to such difficulty in reproduction. The pixel distribution as utilized in the present example will be observed as being a totally and completely random distribution.

Figure 2C:
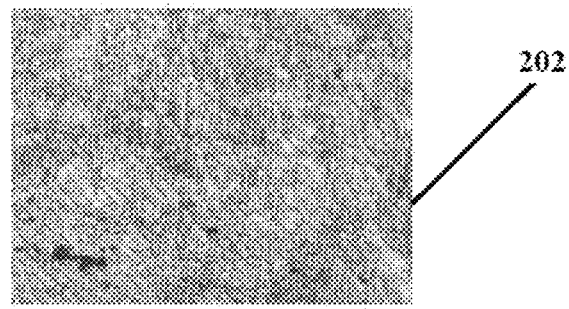
FIG. 2(c) depicts a microscopic photographic representation of an article of 24K gold upon which a mark from the mold of FIG. 2(a) and FIG. 2(b) has been imprinted thereon, at a magnification of 20×.
Figure 2D:
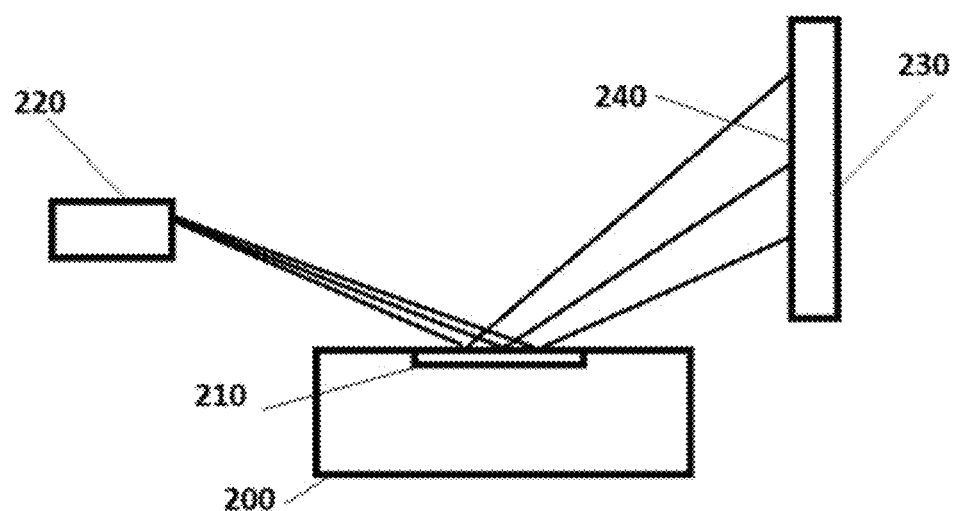
FIG. 2(d) depicts a schematic representation of a methodology for the viewing of a mark of FIG. 2(c)

In order to mark an article, a mold 201 which includes the pattern of FIG. 2(a) and FIG. 2(b) is urged against an outer surface of an article 202 formed from a suitably ductile material, such as gold, gold based alloys, precious metals and the like as shown in FIG. 2(c), and the material is cold worked so as to provide an inverted representation of the pattern of the mold in the article 202.

In other embodiments, other methodologies of applying the pattern to an article 201 may be implemented as discussed below, without departing from the invention and as also applicable to the present embodiment.

After a short pressing duration, the mold 201 and pressed article are separated and the feature of the pattern is transferred from the mold 201 to pressed object 202 as shown in FIG. 2(c).

The marking may be applied by way of an automated press, such as a pneumatic or hydraulic press. Alternatively, a manual press, which may be a pneumatic or hydraulic press for example, may be utilized. In such manual process, the time duration for marking a material takes only a matter of seconds.

As will be noted, the pattern on the article 202 of FIG. 2(*c*) appears random and non-uniform, without any optically distinguishable pattern or features, and the mark itself is not geometrically represented on the article.

In order to view the holographic image, as shown in FIG. 2(*d*) by way of a schematic representation, a light source 220 is directed towards the pattern 210 on the article 200, and light is reflected towards viewing panel 230, upon which a pre-defined pattern 240 is viewable.

Referring to the pattern as imparted to the article as shown in FIG. 2(*c*), the pattern has been designed such that a holographic image may be projected, whereby the requisite wavelength and incident angle for viewing the mark were both determined during the design process of the pattern, and for this example a dedicated for 532 nm green light, with 10 degree incident angle is utilized in order to project the holographic image are utilised.

It should be noted that the image may still be viewed from the mark on the article with other wavelengths and incident angles, however the difference is the projected pattern size of sharpness.

In a mold for forming such a mark, the micro entities may have a height of 3 microns or less, which may be utilised for the formation of a pattern suitable for projection of a holographic image.

Both the wavelength and incident angle affect the diffraction efficiency, and affect the pattern quality. The wavelength also affects the projected pattern size. The projection of the pattern requires no particular specialized equipment, and a coherent light source, such as from a laser pointer, may be utilized.

A secret or unique identification mark as applied to the article is unique and has a very high difficulty for reproduction by third parties, as it requires complex theoretic design incorporation within the pattern formed in the mold which is then imparted into the gold article. As such, this technique provides excellent anti-counterfeiting protection.

Regular Arrangement of Micro Entities—Periodic or Quasi-Periodic

In accordance with the present invention, a 2.5D mold may be formed with a regular arrangement of micro entities in a periodic or quasi-periodic arrangement in an inverse of the structure which is to be imparted to an article formed from ductile material, such as a gold or gold based material by a stamping process for example. Alternatively, the arrangement may be imparted to an article by way of forging or casting process, as described below.

When arranged in a regular arrangement and the geometry is imparted to an article, such as a periodic or quasi-periodic arrangement, diffracted light has an interference effect such that a marked portion of an article has an enhanced colour effect, which may be illuminated by a white light source, or light source of a predetermined wavelength.

In such an embodiment, the mold includes micro entities arranged so as to form an optical element which may be configured in a predetermined arrangement, and also may formed so as to define a predetermined pattern such as an indicia, when imparted to an article.

This may provide a unique and difficult to reproduce lighting effect which may also be in combination with an indicia or pattern effect.

In accordance with an embodiment of the present invention, the optical element is applied to an article formed from a ductile material such as a gold or gold based material, by way of a cold working stamping process for example, whereby the optical element is imparted by way of a mold having the inverse therein of the optical element.

In an example of a regular arrangement, the mold includes a periodic grating arrangement formed from the micro structure, whereby the entities are arranged in a predetermined spatial arrangement, such that when a mark is imparted to a ductile metal such as gold, the inverse of the grating effect is imparted to the surface of the article formed form gold or the like so as to apply the optical element thereon.

Periodic micro structures can change the property of a surface and in the present application, and the use diffractive gratings may be implemented.

Due to the wavelength dependent reflection, the diffractive grating can be utilized so as to display a colorful pattern and thus can be utilized to improve the appearance of an article, or provide an optically identifiable effect, and as described with reference to FIG. 1.

Furthermore, the diffractive grating may consist of distinct patterns which can function as an anti-counterfeit or identification marking by way of an indicia for example. Thus, in addition to the entities being provided in a periodic arrangement, the lattice may also be provided in a pattern, such that an indicia is imparted to the gold article.

The implementation of periodic micro structures on an object such as an article of jewellery may be effected in a mass production and cost effective manner.

In such arrangements, the period of the micro structure may be about 10 microns, and a depth of as low as 1 micron or less, in order to provide the applicable light effect according to the present invention.

Arrangements of the present example include as follows:

(i) Optical Viewing—in a first arrangement, the entities are arranged such that a grating effect is provided by an optical element, which allows the optical element as a mark on the article to be distinguished by the naked eye under visible light, for example under the condition of sunlight or fluorescent light, and such white light conditions.

In such an arrangement, the mark can be visually identified for authentication identification, and no specialised equipment is necessary or required for the viewing of the mark.

In such an arrangement, a colour effect may be imparted to the article which, optionally in combination with a particular indicia, provides a unique identification mark for a gold or gold based article of jewellery or ornament.

(ii) Other Viewing Devices—In other arrangements, an optical element may consist of a particular pattern such as an indicia which may only be viewable under the light of a certain range of wavelength, and only in such a case may such a hidden mark be seen.

In such an arrangement, a specialised device or equipment is necessary and required for identification and their authentication device.

Such an arrangement may be utilized to provide a unique identification mark for a gold or gold based article of jewellery or ornament, and provides for increased security and difficulty of reproduction and counterfeiting.

As will be understood by those skilled in the art, the present invention may be utilized so as to provide intricate patterns to metallic jewellery articles, in particular gold jewellery articles, reducing the ability for unscrupulous persons to readily replicate such a pattern.

Within the present embodiment, the microstructure forming the optical element imparted to a jewellery article or ornament formed from a gold material is a two and a half dimensional (2.5D), and provide an optical element to the article as a marking for purposes including those above.
Examples of Periodic 2.5D Arrangements of Molds of the Invention As shown in FIG. 3(*a*), a typical 2D structure 300*a* consisting of one protruded structure 311*a* is depicted which is used for reference in relation to FIGS. 3(*b*) to 3(*f*) in which 2.5D structure of a mold for transfer of an optical element to a deformable material are depicted and described.

Referring to FIG. 3(*b*) to FIG. 3(*f*), there are depicted examples of a schematic representation of 2.5D micro structure of a mold for transfer of an optical element to an article in accordance with embodiments of the present invention. Such a mold including such microstructures so as to provide concave portions or microstructures according to the present invention, which permits the flow of the deformable material therein. The use of such a mold of FIGS. 3(*b*) and 3(*f*) in providing an optical element as a marking are further discussed in reference to FIGS. 4(*a*) to 4(*c*) below.

As shown in FIG. 3(*b*), a concave micro structure 312 on the top of the protruded structure 311*b* of a micro structure 300*b* is provided In the example of FIG. 3(*c*), concave structures 314 at the bottom of the protruded structures 311*c* of a micro structure 300*c* are provided.

The example of FIG. 3(*d*) has concave structure 315 at the bottom of the protruded structure 311*d* of a micro structure 300*d* is provided.

The example of FIG. 3(*e*) has provided a concave structure 316 at the bottom and protruded structure 317 at the top of the protruded structure 311*e* of a micro structure 300*e* are provided.

In reference to the example of FIG. 3(*f*), concave structures at the bottom 318 and top 319 of the protruded structure 311*f* of a micro structure 300*f* are provided.

Within the present embodiments, concave structures 312, 314, 315, 316, 318 and 319 are provided in accordance with the present invention, which provide a relief structure when a mold embodying such concave microstructures is utilised in forming an optical element in a deformable material, whereby the optical element may be a marking, pattern or indicia in accordance with the present invention. The manner in which such concave microstructures are operable is discussed further as follows.

Figure 3A:
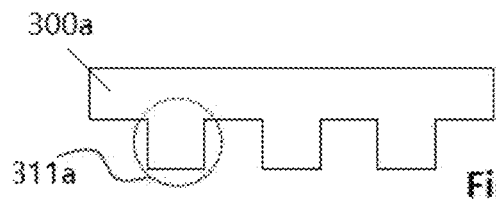
FIG. 3(a) depicts a typical 2D structure for reference in relation to FIGS. 3(b) to 3(f)
Figure 3B:
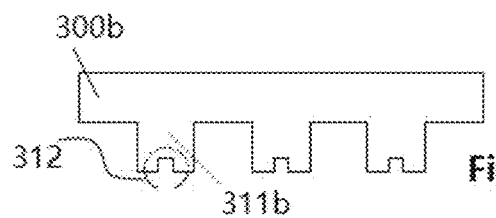
FIGS. 3(b) through 3(f) depict cross-sectional schematic representations of examples of 2.5D structures utilised in a mold for transfer a 2.5D micro structure optical element to an article accordance with the present invention.
Figure 3C:
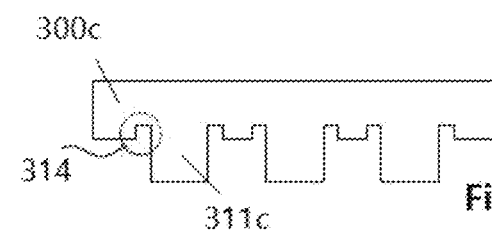
Figure 3D:
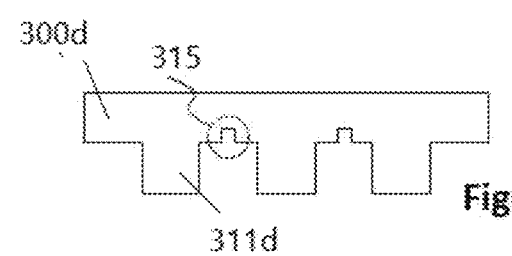
Figure 3E:
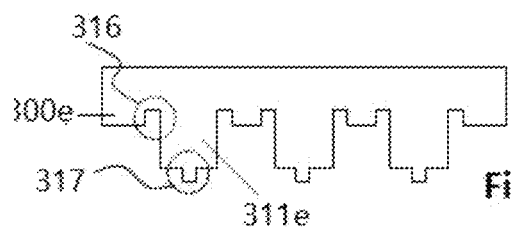
Figure 3F:
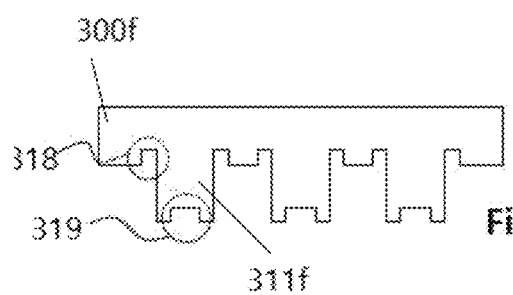
Figure 4A:
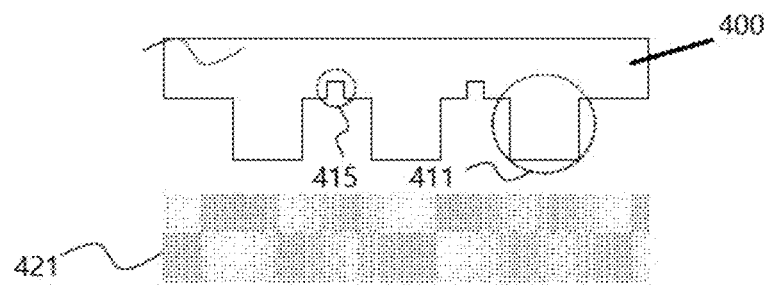
FIGS. 4(a) to 4(c) depicts a schematic representation of a process to transfer an example of a 2.5D micro structure optical element to an article.
Figure 4B:
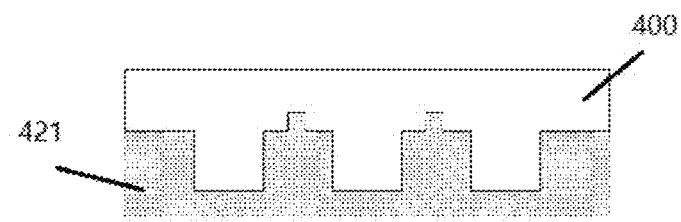
Figure 4C:
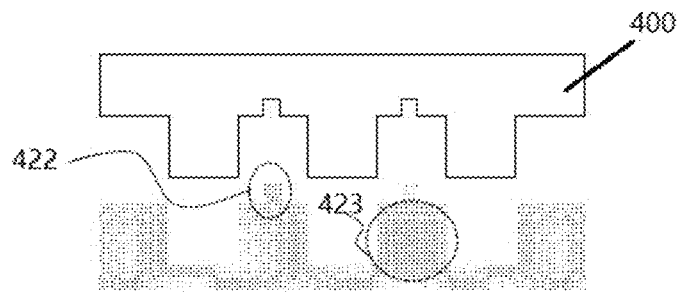

Referring to FIGS. 4(*a*) to 4(*c*), the process for forming a 2.5D micro structure in a ductile material 421 in accordance with the present invention is depicted. In this example, the 2.5D micro structure of FIG. 3(*e*) is utilized for illustrative purposes.

As shown in FIG. 4(*b*), during the molding process, the material is pressed and squeezed to be conformal with the protruded structure 411 and the concave structure 415 of a mold 400, with ductile material 421 being urged into the concave structure 415. The mold 400 may be considered similar to the example of a mold as shown and described with reference to FIG. 3(*d*).

After the mold is removed, on the surface, the material of an article forms the small protruded parts 422 corresponding to concave structure 415 on the main protruded part 423 as illustrated in FIG. 4(*c*) and then the 2.5D pattern is transferred from the mold 400 to the molded article.

As will be seen, ductile material 421 is urged into the concave structure 415, which is urged so as to flow and extend in the direction of towards the mold 400 as shown by protruded parts 422.

By provision of such a feature in accordance with the present invention, ductile material 421 is permitted to flow in the vertical direction, that is towards the mold 400, such that ductile material 421 does not flow in the horizontal direction transverse to the direction of movement of the mold 400 with respect to the ductile material 421 which causes damage to the mold 400, which results in deterioration of the mold and reduces dimensional accuracy as well as reproduction of the marking, pattern or indicia, which reduces consistency as well as the necessity of mold replacement. As mentioned below, mold of the prior art have a low life cycle, with typically less than 100 uses due to deterioration and failure.

The provision of such a relief feature as provided by the present invention, in addition to other advantages as recited and discussed below, has the effect of placing lower stresses on the mold 400 during the process of imparting a marking, pattern or indicia to an article formed from the ductile material 421, which has the technical effect of increasing longevity of the mold and enhanced repeatability of the marking, pattern or indicia applied to an article. Other technical advantages of a 2.5D mold providing such a feature of allowing flow of the ductile material 421 in the vertical direction as provided by a mold according to the present invention are discussed further below.

2.5D Molds and Markings, Patterns or Indicia of Present Invention

Such advantages are applicable to a regular 2.5D microstructure molds as shown in FIGS. 3(*a*) to 3(*g*) and FIGS. 4(*a*) to 4(*c*), as well as irregular 2.5D microstructures such as for the implementation of holographic representations applications as described with reference to FIGS. 2(*a*) to 2(*d*), as well as other irregular 2.5D microstructures.

In accordance with the present invention, the topography of the microstructure arrangement need not necessarily be a defined by only vertical and horizontal surfaces, but may include curved or contoured surfaces. However, in order to provide the feature to allow flow of ductile material in the direction of away from then surface of an article formed from the ductile material, or having a ductile material coating, it is necessary that the concave structures do not have "undercuts" so that the mold can be readily removed from the ductile material after a marking, pattern or indicia is formed in the ductile material.

As will be understood, whilst in the above examples present the mold is depicted with sharp corners and only purely horizontal and vertical surfaces, there may be a small amount of curvature at the intersection of the horizontal and vertical surfaces. Further, the surfaces need not necessarily be precisely horizontal and vertical, and provided that a 2.5D microstructure is provided which provides the requisite functional attributes of a marking, pattern or indicia applied to an article, including any requisite optical characteristics, as well as provides a relieve structure which allows vertical flow of the ductile material, a mold for providing a marking, pattern or indicia, a marking, pattern or indicia as applied to an article and an article bearing such a marking, pattern or indicia. Further, the micros structure may be multi-level, and not necessarily have a parallel depth or protrusion attributes. Accordingly, any combination of microstructures including concave relief portions are considered to fall within the scope of the present invention.

Examples of Manufacture of Mold of Invention

There are several manners in which a mold according to the present invention may be manufactured, and examples thereof are provided.

Referring to FIGS. 5(a) to 5(e), there is depicted a process for the formation of a 2.5D mold 500 for providing optical elements in a ductile material in accordance with the present invention, by way of micro fabrication techniques.

Referring to FIG. 5(b), a photoresist 520 is coated on the surface of the material from which the mold 500 is to be formed. The mold 500 is preferably formed from a hard material such as nickel or a nickel alloy.

In FIG. 5(c), the photoresist 520 undergoes an exposure process either by way of a conventional photo mask or by direct writing technology including laser, electron beam or the like.

Following the exposure process of FIG. 5(c), as depicted in FIG. 5(d), the surface of the mold 500 is etched to a requisite depth.

After the etching process of FIG. 5(d), as depicted in FIG. 5(e) the photoresist 520 is removed and then via ion beam technology for example, the small features including both the protruded and concave structures can be created in the mold 500 surface, with a mold resulting similar to that as depicted in FIG. 3(b).

Figure 6A:
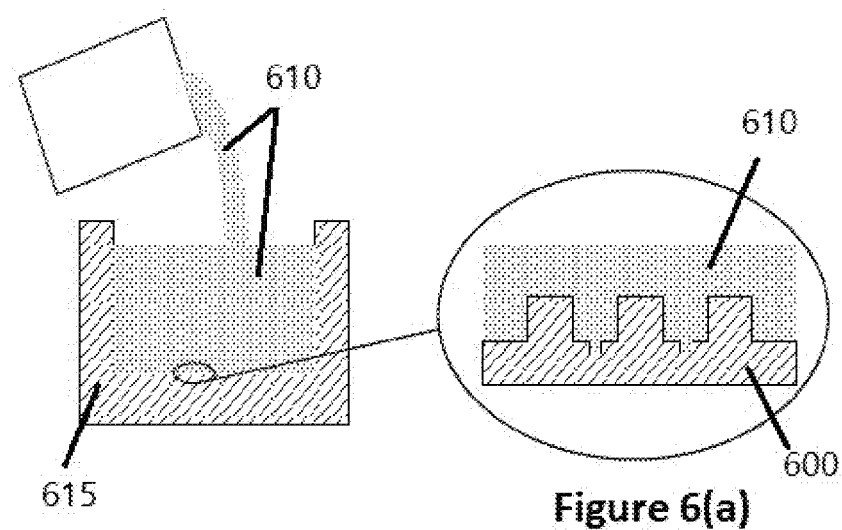
FIGS. 6(a) and 6(b) depict a schematic representation of a casting process using a die with a 2.5D surface micro structure for imparting an optical element to a material.
Figure 6B:
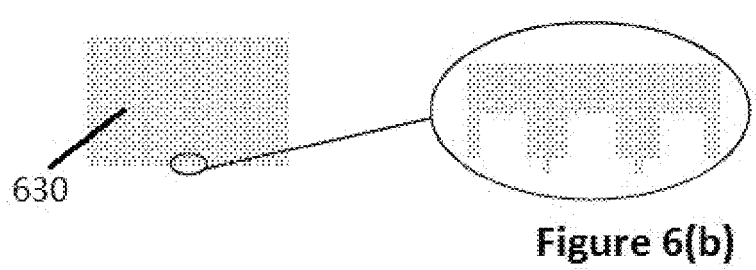

Referring to FIG. 6(a) and FIG. 6(b), the mold 600 as described with reference to FIGS. 5(a) to 5(d) and in accordance with the present invention, a casting process may be utilized in conjunction with the mold 600 so as to form an optical element in a material with the mold having surface periodic or non-periodic 2.5D micro structure.

Molten material 610 is poured into the mold body 615 and the 2.5D structures on the surface of the mold 600 are filled with the molten material 610. Such a molten material 610 may be any material applicable for which an article to which an optical element is to be applied.

So as to ensure the flow of molten material 610, the mold 600 which is similar in geometry to that of FIG. 3(b) may heated to a sufficiently high temperature. Following cooling and solidification of the molten material 610, the 2.5D structure is transferred from the mold 600 to the casted object 630 as shown in FIG. 6(b).

With reference to FIGS. 7(a) to 7(e) is shown application of an optical element to a material 720a 720b 720c utilizing the mold 700 as described with reference to FIGS. 5(a) to 5(e) by way of a forging process by die formed by the mold 700 and having the surface periodic 2.5D micro structure is depicted.

A sufficiently ductile material 720a 720b 720c is placed on the die and then pressed. The configuration can be open forge in FIG. 7(a), closed forge FIG. 7(b) or flash forge FIG. 6(c). Due to the pressure, the material on the surface will deform so as to conform to the die surface as shown in FIG. 7(d), thus the 2.5D structures are transferred to the forged object as shown in FIG. 7(e).

Figures 8A, 8B:
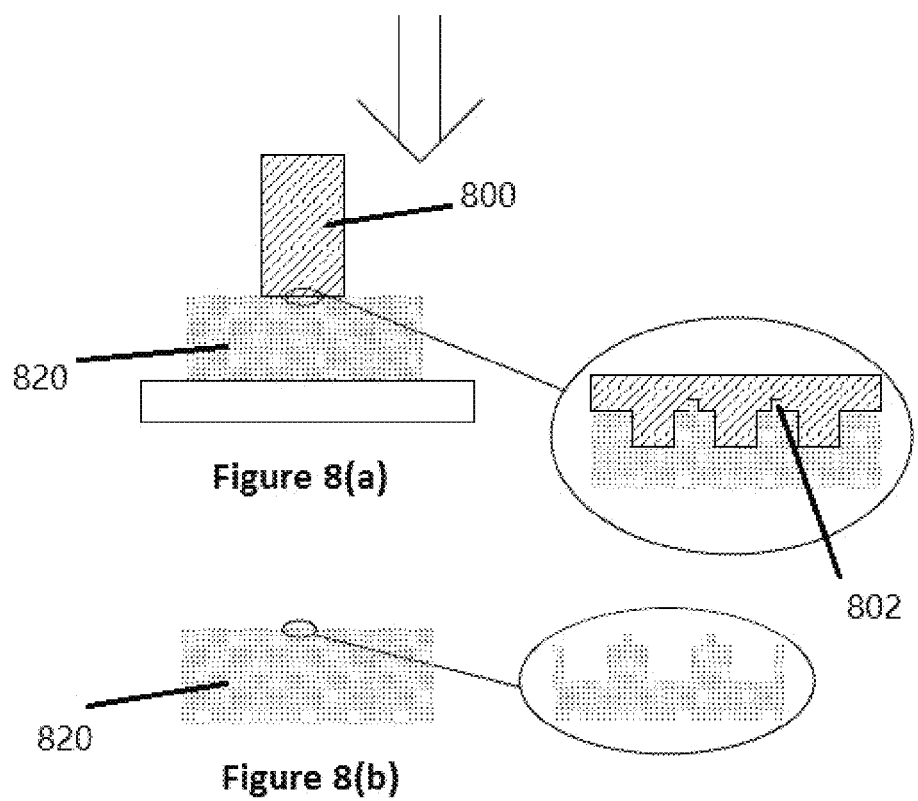
FIGS. 8(a) and 8(b) depict a schematic representation of a stamping process for imparting a 2.5D optical element to the surface of an article.

Referring to FIG. 8(a) and FIG. 8(b) there is depicted a stamping process by stamp with surface periodic 2.5D micro. The stamp is that of the mold as described with reference to FIGS. 5(a) to 5(d).

As shown in FIG. 8(a), a stamp 800 with the surface 820 covered by 2.5D micro structures is pressed onto an article 820 to which the optical element is to be applied.

Similarly to the forging process as described with reference to FIGS. 7(a) to 7(e), the material 820 is pressed and deforms into a shape conformal to the stamp 800 surface. In this manner, the 2.5D micro structures 802 are transferred to the stamped article 820 as illustrated in FIG. 8(b).

In other and alternate embodiments, the mold may be formed by direct laser writing, or by a photoresist/LIGA technique, without departing from the scope of the invention.

Although the above examples are with reference to a period 2.5D structure, a non-periodic 2.5D structure may be imparted to an article in a similar manner, in accordance with the present invention.

Figure 9A:
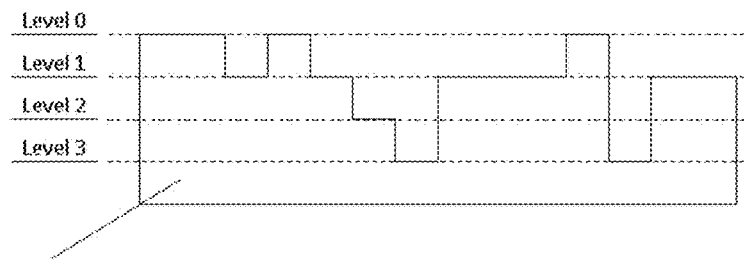
FIG. 9(a) shows a sectional side view of a schematic representation of an article having a multi-level marking according to the present invention.
Figure 9B:
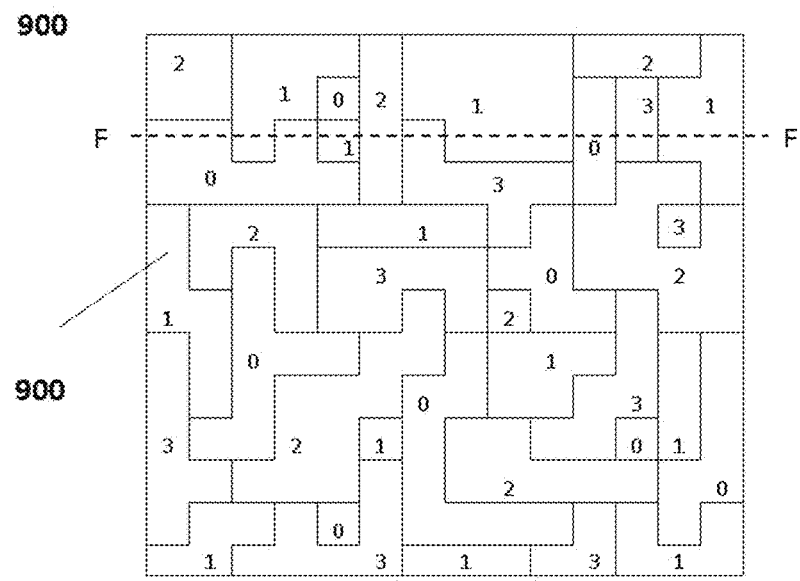
FIG. 9(b) shows a top view of the article of FIG. 9(a)
Figure 9C:
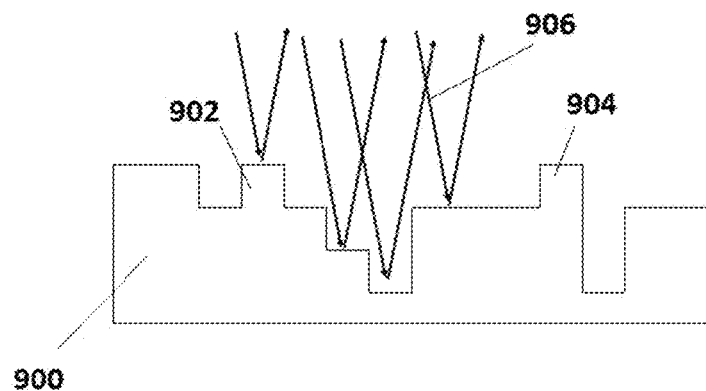
FIG. 9(c) shows s a sectional side view of the schematic representation of the article of FIGS. 9(a) and 9(b) through the line F-F of FIG. 9(b).

For example and as shown in FIGS. 9a, 9b and 9c, schematic representation of a multi-level structure is formed in an article 900, having multiple levels. As is evident, the micro entity structure is an irregular non-periodic arrangement, whereby the article has been marked with a mold having an inverse shape to the profile as shown.

Such a mold includes recesses or rebates, which allows for protruding portions 902 and 904 as micro entities to be formed, whilst not imparting excessive lateral stresses on the mold, in accordance with the present invention.

As will be understood by those skilled in the art, complex 2.5D patterns, such as for holographic applications may be provided. Although the calculations of the topographies and geometries for such mold is complex, a suitable requisite mold may be provided for reflection of light 906 in such an application.

2.5D Mold Advantages

The use of a 2.5D mold for the formation of marks in accordance with the present invention, provides several advantages over the prior art, including:

(i) The 2.5D structure provides a "relief" feature in the mold and as such, when used in a stamping or forging process, the ductile material may flow into the relief space. This causes less stress to be imparted to the mold and thus increases the fatigue life cycle.

An identification mark as provided by the present invention must be difficult to reproduce and must be consistent, for anti-counterfeiting purposes. As such, with a high usage cycle mold being provided, as opposed to stamping molds of the prior art which typically fail in less than 100 uses, obviates the necessity for such molds to be replaced, thus providing consistent marks to numerous articles, thus enhancing security by having a consistent original mark to articles.

Further, such molds are relatively expensive to produce, and a mold of high lifecycle provides additional cost benefits.

(ii) A mold as provided by the present invention can be highly complex and difficult to reproduce due to such intricate geometric complexity and utilised of the 2.5D characteristic and thus, a high life cycle intricate mold provides increased benefits from security and anti-counterfeiting standpoints.

(iii) A 2.5D mold according to the present invention provides less damage to the article to which a marking is to be applied with reduced localized stresses in the article, and the relief structure provides for ease of stress reduction during a cold working process such as stamping.

Accordingly, the marks applied to the article are more consistent, which increases ease of identification and assessment of originality of the mark and hence the article to which the mark is applied.

(iv) Due to the reduced stresses induced in both the mold and the article during formation of the mark, this provides for ease of removal of a mold resulting in localized damage and distortion of the mark, again which increases ease of identification and assessment of originality of the mark and hence the article to which the mark is applied.

(v) Due to decreased stresses of the 2.5D mold, a mold of a smaller size than those of the prior art may be provided, which provides the advantages of (a) a more intricate security mark being able to be formed on an article and (b) increased difficulty to locate a hidden security mark due to a decreased physical size being obtainable.

Furthermore, when a 2.5D mold is utilized in holographic applications as described above, an increased sharpness of the projected image may be produced, which increases ease of identification and assessment of originality of the mark and hence the article to which the mark is applied.

The above new technology provides a mold for providing security markings to metallic articles, in particular gold or gold based or other suitable precious metals forming articles such as articles of jewellery. The marking can be of very high precision and large complexity, and difficult to be replicated.

The present invention provides an optical element for the marking of jewellery or ornaments formed from gold or gold based materials, for:
Assessing authenticity of an article of jewellery or an ornament,
Identification of an article of jewellery or an ornament,
Demonstrating origin of an article of jewellery or an ornament,
Security identification of an article of jewellery or an ornament, and
Anti-counterfeiting and anti-theft protection of an article jewellery or an ornament.

What is claimed is:

1. A mold for imparting a marking including a requisite optical element having two and a half dimensions (2.5D) to the outer surface of an article formed from a ductile material, said mold comprising:
   a marking surface for imparting the mark to an outer surface of the article by way of localized plastic deformation of the material from which the article is formed upon the mold and the article being urged against each other, said marking surface including a micro-structure formed by an arrangement of a plurality of micro meter sized recessed or protruded entities;
   said entities being arranged in a predetermined arrangement in relation to each other and said entities being arranged as a micro-structure having two and a half dimensions (2.5D), wherein said entities are arranged in an inverse arrangement in respect of the requisite optical element to be formed on the surface of an article, and said entities are arranged so as to provide one or more recesses extending in a direction of from said marking surface into the mold;
   wherein said one more recesses are sized and shaped such that upon the mold being urged against the article, the optical element is imparted to the article upon deformation of the ductile material so as to conform with the surfaces of the plurality of micro meter sized recessed or protruded entities;
   wherein the recesses do not have any laterally extending undercuts such that the material which is urged into the recesses and which forms a shape defined by the geometry of the recesses is not damaged when the mold is removed from the article following formation of the marking; and
   wherein ductile material is plastically deformed and urged into said one or more recesses and conforms with the recesses, wherein deformation and flow of the ductile material into the recesses reduces lateral stresses imparted to the mold adjacent the recesses, and ductile urged into the recesses forms a portion of the material from deformation of the ductile material being imparted to the entities optical element having two and a half dimensions (2.5D).

2. The mold according to claim 1, wherein the entities are arranged in a periodic arrangement in at least one direction.

3. The mold according to claim 2, wherein the entities are arranged in a periodic arrangement at a predetermined period such that when the optical element is imparted to the article, upon exposure of light to optical element, light of a predetermined wavelength is reflected by the optical element such that the optical element is viewable having an enhanced color effect of said wavelength.

4. The mold according to claim 3, wherein the entities are arranged in a predetermined geometric relationship such that the optical element imparted to the article includes an indicia therein.

5. The mold according to claim 1, wherein the entitles are arranged in a predetermined arrangement, such that light of a predetermined wavelength and angle of incidence is reflected from an optical element imparted to the article in a manner so as to provide a projected holographic representation.

6. The mold according to claim 5, wherein the entities include entities that are arranged in a random and irregular distribution.

7. An article formed from a ductile material having a marking including a requisite optical element having two and a half dimensions (2.5D) formed on the outer surface of the article, said marling including:
   a micro-structure formed by an arrangement of a plurality of micro meter sized recessed or protruded entities, said entities being arranged in a predetermined arrangement in relation to each other and said entities being arranged as a micro-structure having two and a half dimensions (2.5D); and
   wherein the arrangement of the plurality of micro meter sized recessed or protruded entities provides a marking including an optical element.

8. The article according to claim 7, wherein the entities are arranged in a periodic arrangement in at least one direction.

9. The article according to claim 8, wherein the entities are arranged in a periodic arrangement at a predetermined period such that upon exposure of light to optical element, light of a predetermined wavelength is reflected by the optical element such that the optical element is viewable having an enhanced colour effect of said wavelength.

10. The article according to claim 7, wherein the entities are arranged in a predetermined geometric relationship such that the optical element article includes an indicia therein.

11. An article according to claim 7, wherein the entitles are arranged in a predetermined arrangement, such that light of a predetermined wavelength and angle of incidence is imparted to the article in a manner so as to provide a projected holographic representation.

12. The article according to claim 7, wherein the entities include entities that are arranged in a random and irregular distribution.

13. The article according to claim 7, wherein the article is formed from a metal or a metal alloy.

14. The article according to claim 7, wherein the article is formed form gold or a gold based metal.

15. The article according to claim 7, wherein the article is an article of jewelry.

16. The article according to claim 7, wherein the optical element provides an identification mark to the article.

17. A method of applying a marking including an optical element to an article formed from a ductile material, comprising:
   using a mold according to claim 1 and urging it against an outer surface of the article and, thereby, forming the marking including the optical element from an inverse of the arrangement of the entities of the mold.

18. An article having a marking including an optical element thereon, wherein the optical element has been imparted to the article by way of the method according to claim 17.

19. The article according to claim 18, wherein the article is formed from a metal or a metal alloy.

20. The article according to claim 18, wherein the article is formed form gold or a gold based metal.

21. The article according to claim 18, wherein the article is an article of jewelry.

22. The article according to claim 18, wherein the optical element provides an identification mark to the article.

23. A method of providing an optical element to an article, comprising:
   providing a mold as described in claim 1, and
   applying a molten material to the mold by way of a casting process, or urging an article to which the optical element is to be applied against the mold by way of a forging process, or urging an article to which the optical element is to be applied against the mold by way of a stamping process.

* * * * *